US009481309B2

(12) United States Patent
Sakarian et al.

(10) Patent No.: US 9,481,309 B2
(45) Date of Patent: Nov. 1, 2016

(54) VEHICLE SEAT ITEM RETENTION SYSTEM

(71) Applicant: Ford Global Technologies, LLC, Dearborn, MI (US)

(72) Inventors: Artur Sakarian, Birmingham, MI (US); Annette Lynn Huebner, White Lake, MI (US); Ryan Welch, Monroe, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 14/156,497

(22) Filed: Jan. 16, 2014

(65) Prior Publication Data

US 2015/0197200 A1 Jul. 16, 2015

(51) Int. Cl.
*B60R 7/04* (2006.01)
*B60N 2/02* (2006.01)
*B60N 2/44* (2006.01)
*B60R 11/00* (2006.01)
*B60N 2/36* (2006.01)

(52) U.S. Cl.
CPC ............... *B60R 7/043* (2013.01); *B60N 2/02* (2013.01); *B60N 2/441* (2013.01); *B60N 2002/363* (2013.01); *B60R 2011/0043* (2013.01)

(58) Field of Classification Search
USPC .................................... 297/487, 488, 184.13
See application file for complete search history.

(56) References Cited

U.S. PATENT DOCUMENTS

| | | | | |
|---|---|---|---|---|
| 3,330,575 A | * | 7/1967 | Boudreau | 280/648 |
| 5,492,257 A | * | 2/1996 | Demick | 224/275 |
| 5,522,639 A | * | 6/1996 | Jaime | 297/184.13 |
| 5,806,924 A | * | 9/1998 | Gonas | 297/216.11 |
| 6,079,773 A | * | 6/2000 | Hassan | 297/188.13 |
| 6,405,391 B1 | * | 6/2002 | Hakansson | 5/118 |
| 6,742,837 B1 | * | 6/2004 | Alexander | B60R 7/043 297/188.04 |
| 7,537,279 B2 | | 5/2009 | Pudney | |
| 8,220,416 B1 | * | 7/2012 | Stahl | 119/496 |
| 8,360,519 B1 | | 1/2013 | Hsu | |
| 2006/0061152 A1 | * | 3/2006 | Pudney | 297/188.01 |
| 2013/0300160 A1 | * | 11/2013 | Cho | B60R 7/043 297/188.01 |
| 2013/0300161 A1 | * | 11/2013 | Cho | B60R 7/043 297/188.2 |

FOREIGN PATENT DOCUMENTS

| | | |
|---|---|---|
| DE | 19735098 A1 | 2/1999 |
| DE | 102004017368 A1 | 10/2005 |
| DE | 102004056251 A1 | 5/2006 |
| DE | 102007034105 A1 | 1/2009 |
| DE | 102008059257 A1 | 6/2010 |

* cited by examiner

*Primary Examiner* — David E Allred
(74) *Attorney, Agent, or Firm* — Vichit Chea; Price Heneveld LLP

(57) ABSTRACT

A vehicle seat retention system includes a vehicle seating assembly having a seat, which includes a seating surface and a seatback having seatback surface. A continuous peripheral rim is disposed on a first side, a second side, and a front of the vehicle seat, below the seating surface of the vehicle seating assembly. A first telescoping extension is disposed at a forward corner defined between the first side and the front of the vehicle seat. A second telescoping extension is disposed at a forward corner defined between the second side and the front of the vehicle seat. A deployable net is disposed between the seat and the peripheral rim. The deployable net is configured to be concealed within a seat base disposed below the seating surface.

17 Claims, 5 Drawing Sheets

VEHICLE SEAT ITEM RETENTION SYSTEM

FIELD OF THE INVENTION

The present invention generally relates to a vehicle seat item retention system, and more particularly to an item retention system that is operable between a deployed position and a concealed position.

BACKGROUND OF THE INVENTION

Various vehicles include storage areas that are undivided open spaces into which many different articles can be positioned. Certain storage areas include hooks, individual compartments, and other features that can be used to organize cargo that is placed within a cargo area of a vehicle, but have limited cargo storage options. Many of these features have a single use and limited functionality, wherein the cargo storage features are not adaptable to position cargo of varying orientations, sizes, or materials. In addition, these features do not include a retention system that is operable between a deployed position and a concealed position.

SUMMARY OF THE INVENTION

In at least one aspect, a vehicle seat retention system includes a vehicle seating assembly having a seat, which includes a seating surface and a seatback having seatback surface. A continuous peripheral rim is disposed on a first side, a second side, and a front of the vehicle seat, below the seating surface of the vehicle seat retention system. A first telescoping extension is disposed at a forward corner defined between the first side and the front of the vehicle seat. A second telescoping extension is disposed at a forward corner defined between the second side and the front of the vehicle seat. A deployable net is disposed between the seat and the peripheral rim. The deployable net is configured to be concealed within a seat base disposed below the seating surface.

In at least another aspect, a vehicle seat retention system includes a vehicle seat having a seating surface. A peripheral rim is disposed on first and second sides and a front of the vehicle seat. A first elongate extension is disposed at a corner defined between the first side and the front of the vehicle seat. A second elongate extension is disposed at a corner defined between the second side and the front of the vehicle seat. A deployable net is disposed between the seat and the peripheral rim.

In at least another aspect, a vehicle seat retention system includes a vehicle seat. A peripheral rim is disposed on first and second sides and a front of the vehicle seat above a seat base. First and second telescoping extensions moveably couple the peripheral rim to the seat base. A deployable net is disposed between the seat and the peripheral rim. An elastic member is coupled to the net to keep the net taut when the net is deployed.

In still another aspect, a vehicle seat retention system includes a vehicle seat with a peripheral rim configured to move between raised and lowered positions. A net extends downwardly from the peripheral rim. The peripheral rim and net are configured to secure items on a vehicle seat and to prevent the same from movement during travel. The vehicle seat retention system provides additional safety to a user and also minimizes the likelihood of damaged or broken cargo positioned on the vehicle seat.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
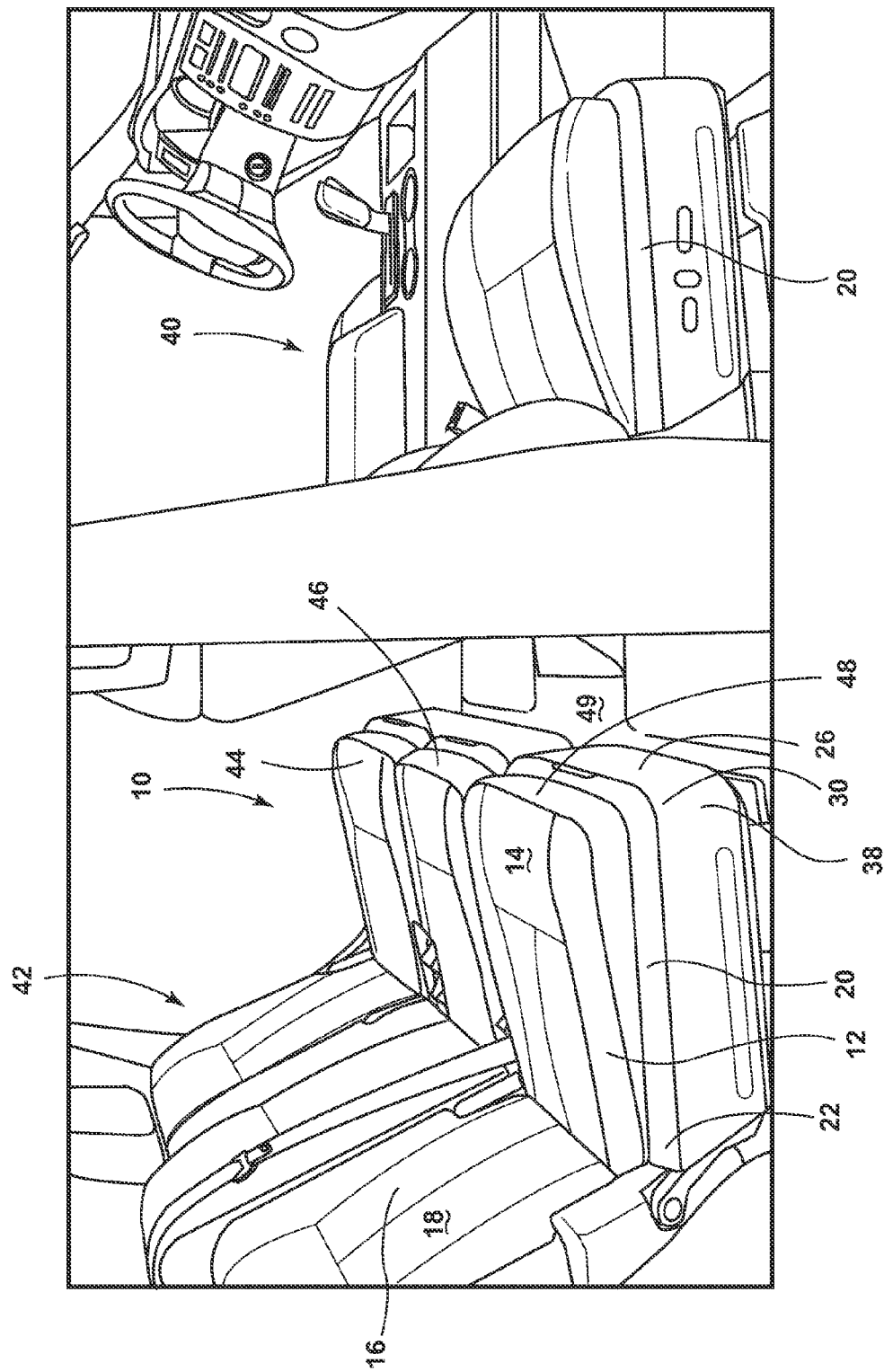
FIG. 1 is a side perspective view of one embodiment of a vehicle seat retention system of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a vehicle seat retention system having a seat 12, which includes a seating surface 14 and a seatback 16 having a seatback surface 18. A continuous peripheral rim 20 is disposed on a first side 22, a second side 24, and a front 26 of the seat 12, below the seating surface 14 of the vehicle seat retention system 10. A first telescoping extension 28 is disposed at a forward corner 30 defined between the first side 22 and the front 26 of the seat 12. A second telescoping extension 32 is disposed at a forward corner 34 defined between the second side 24 and the front 26 of the seat 12. A deployable net 36 is disposed between the seat 12 and the peripheral rim 20. The deployable net 36 is configured to be concealed within a seat base 38 disposed below the seating surface 14.

Figure 2:
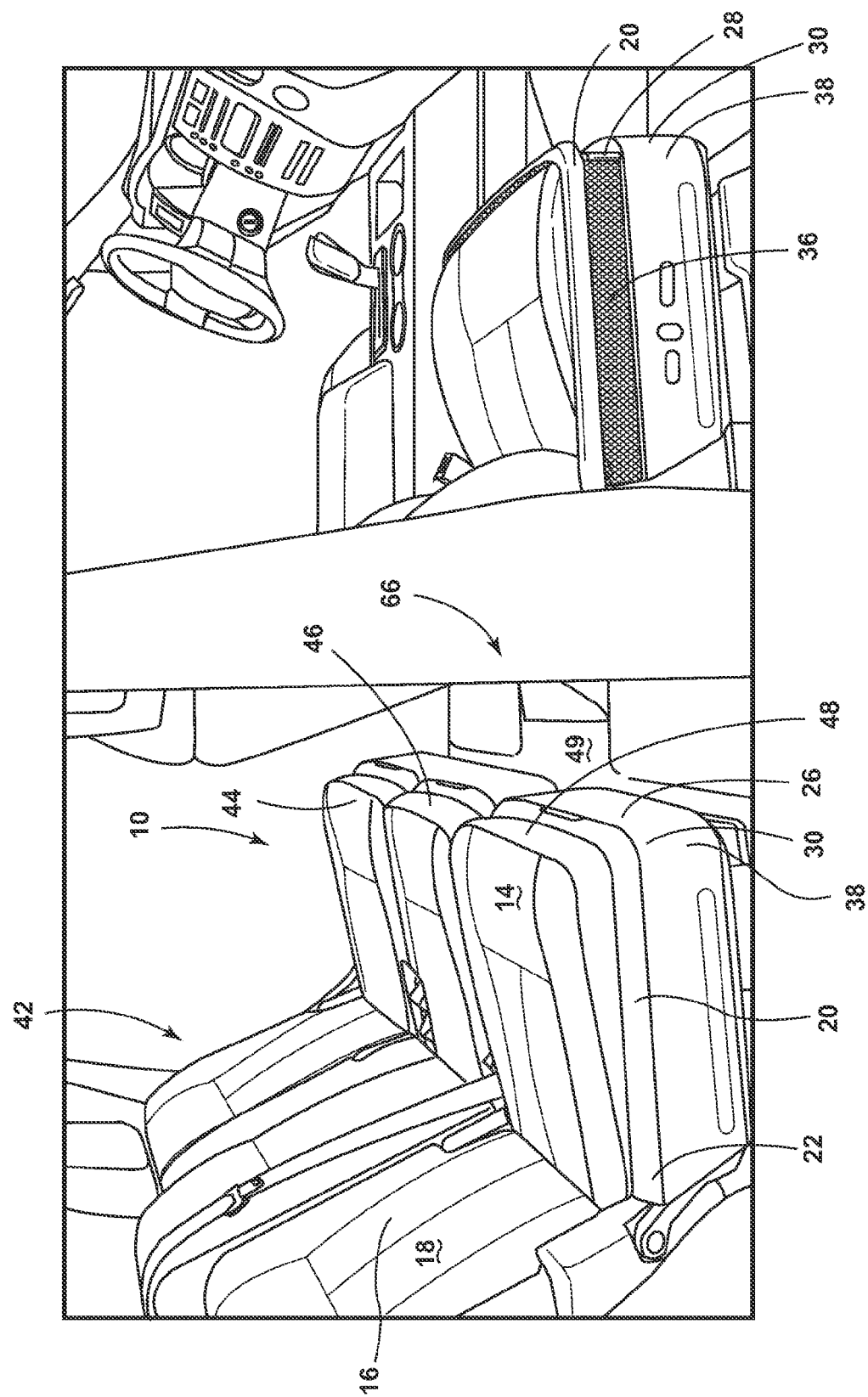
FIG. 2 is a side perspective view of the vehicle seat retention system of FIG. 1 with a deployable net in a partially deployed position.

With reference to the embodiment shown in FIGS. 1 and 2, the vehicle seat retention system 10 is generally configured for use in a front passenger seat 40 or a rear passenger seat 42 of a vehicle. In the illustrated embodiment, the rear passenger seat 42 includes three distinct seating members 44, 46, 48 configured to support three separate passengers. Each of the seating member 44, 46, 48 is supported above a floor 49 of a vehicle. Each seatback 16 is pivotally connected with each seat 12 to provide additional comfort to passengers depending on the angle reclination the passenger prefers. The seating members 44, 46, 48 in particular are generally soft and made of a pliable foam or spacer material designed to support the weight of a passenger, yet provide comfort during travel.

Figure 3:
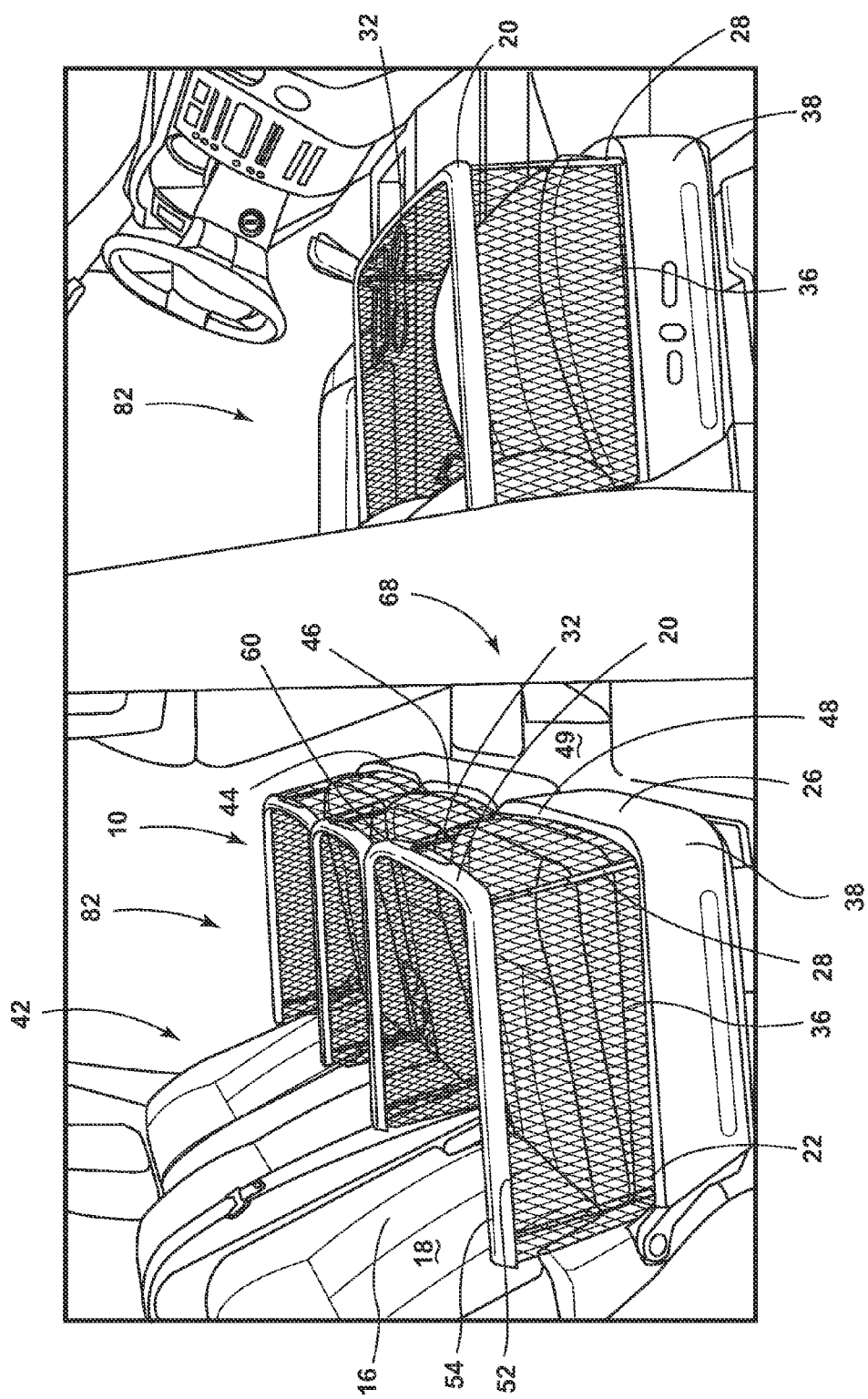
FIG. 3 is a side perspective view of the vehicle seat retention system of FIG. 2 with multiple deployable nets in a fully deployed position.

Referring now to the embodiments generally illustrated in FIGS. 1-3, a bottom portion of the seat 12 is supported by the seat base 38. The seat base 38 is generally constructed from a rigid material, such as plastic or steel. The seat base 38 supports the seat 12, and at the same time, engages with feet of the vehicle seat retention system 10 that support the entire vehicle seat retention system 10 above the floor 49 of the vehicle. The seat base 38 may conceal the deployable net 36 when the peripheral rim 20 is in a lowered position. Accordingly, the seat base 38 may include rollers, tension members, or storage slots configured to conceal and protect the deployable net 36 when not in use.

Referring again to FIGS. 1-5, the continuous peripheral rim 20 extends from a pivot area between the seat 12 and the seatback 16 to a forward portion of the seat 12. In addition, the continuous peripheral rim 20 extends from the first side 22 of the seat 12 to the front 26 of the seat 12 and back to the second side 24 of the seat 12. Accordingly, the continuous peripheral rim 20 forms a generally U-shaped member. It is generally contemplated that the continuous peripheral rim 20 may include a widened base 52 and a tapered top end 54 to provide an aesthetically pleasing appearance to a passenger and to act as a transitional trim piece between the seat base 38 and the seating surface 14. In addition, the continuous peripheral rim 20 may be of a different color or material to provide an accent in the vehicle seat retention system 10. The continuous peripheral rim 20 is relatively strong and configured to provide a rigid upper portion to the vehicle seat retention system 10 when fully deployed.

With reference again to FIG. 2, in the illustrated embodiment, the continuous peripheral rim 20 is transitioning from a lowered position to an upper or raised position, the deployable net 36 is disposed between the seat base 38 and the continuous peripheral rim 20. It is generally contemplated that excess material of the deployable net 36 may be stored in the peripheral rim 20. Alternatively, excess material of the deployable net 36 may be stored in or below the seat base 38. The peripheral rim 20 includes a pull cup 60 on a front portion thereof generally designed for engagement by a hand of a passenger. The passenger simply lifts the pull cup 60 upward so as to urge the first and second telescoping extensions 28, 32, a third telescoping extension 62, and a fourth telescoping extension 64 upward, thereby moving the telescoping extensions 28, 32, 62, 64 from a retracted position 66 to an extended position 68. In the illustrated embodiment, there are four telescoping extensions 28, 32, 62, 64. The first telescoping extension 28 is disposed at the forward corner 30 defined between the first side 22 and the front 26 of the seat 12. The second telescoping extension 32 is disposed at the forward corner 34 defined between the second side 24 and the front 26 of the seat 12. The third telescoping extension 62 is disposed at a first rear corner 70 behind the first telescoping extension 28, and the fourth telescoping extension 64 is disposed at a second rear corner 72 behind the second telescoping extension 32.

It is generally contemplated that the first and second telescoping extensions 28, 32 may be made of a variety of materials, including plastic or steel, and may include a number of extension members. That is, the first and second telescoping extensions 28, 32 may include first, second, and third extension members 74, 75, 76, or a multitude of extension members. In any case, the extension members 74, 75, 76 are configured to lock when moved to the retracted position 66 and to the extended position 68. When in the retracted position 66, a passenger can unlock the first and second telescoping extensions 28, 32 by urging the pull cup 60 upward, or alternatively, can engage an actuator that unlocks a locking system, such that the continuous peripheral rim 20 may be moved between the extended position 68 and the retracted position 66.

Figure 4:
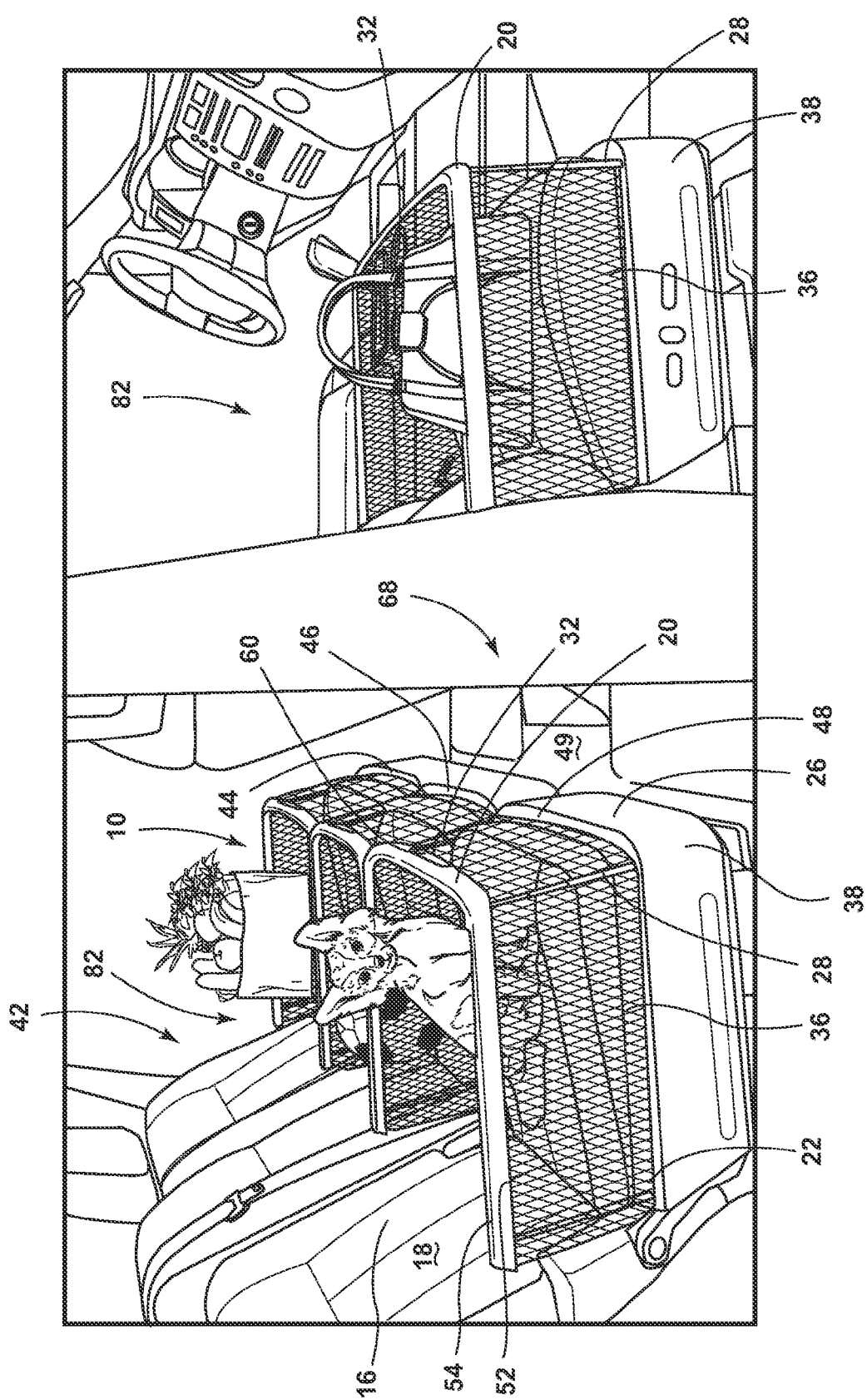
FIG. 4 is a side perspective view of the vehicle seat retention system of FIG. 3 with items contained in the multiple deployable nets.
Figure 5:
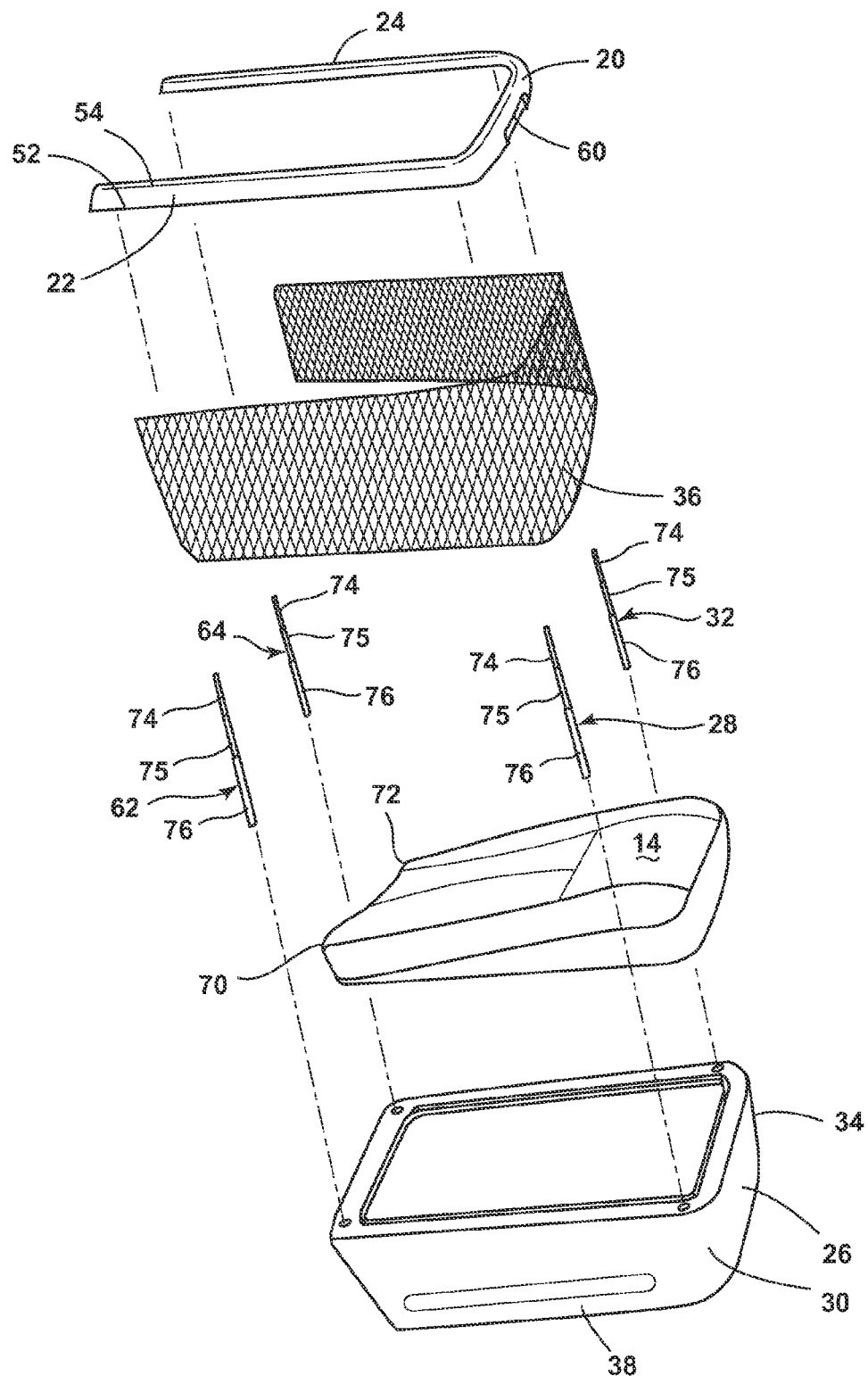
FIG. 5 is an exploded perspective view of the vehicle seat retention system of FIG. 3.

With reference now to FIGS. 3-5, the vehicle seat retention system 10 is shown in a fully deployed position 82. The vehicle seat retention system 10 illustrates the deployable net 36 being at a taut condition. It is generally contemplated that the deployable net 36 may be made of an elastic material that is wound or otherwise collected below the seat 12 and stored when the continuous peripheral rim 20 is in the lower position. Alternatively, the deployable net 36 may be constructed of an elastic material that stretches when the continuous peripheral rim 20 moves from the lower position to the upper position. The first and second telescoping extensions 28, 32 are configured for easy movement between the retracted position 66 and the extended position 68. Further, locking features may be utilized to temporarily secure the vehicle seat retention system 10 in a desired position. For example, the first and second telescoping extensions 28, 32 may be spring-biased to the extended position 68 and held by a detent mechanism in the retracted position 66. Alternatively, the first and second telescoping extensions 28, 32 may be spring-biased to the retracted position 66 and held in the extended position 68 by detents disposed in the extension members 74, 75, 76.

It is also contemplated that the continuous peripheral rim 20 could be operably coupled with other peripheral rims, for example, in the back seat of a vehicle. In this instance, the peripheral rims may be coupled such that the peripheral rims move upward and downward together between the upper and lower positions. In addition, it is also contemplated that a rigid material may be disposed between the peripheral rim 20 and the seat base 38. In this instance, the rigid material is moved down into the seat base 38 in a slot defined by the seat base 38 when the peripheral rim 20 is lowered and withdrawn from the slot when the peripheral rim 20 is raised and the vehicle seat retention system 10 is in the deployed position 82.

The vehicle seat retention system as set forth in the illustrated drawings provides additional storage and cargo area for items that shift easily during travel in the vehicle. As illustrated in FIG. 4, these cargo items may include, but are not limited to, pets, athletic items, such as balls, groceries, and purses/bags. It is also contemplated that peripheral rim may be spring-biased to the upper position or to the lower position. Likewise, the deployable net may be spring-biased so that the deployable net remains taut as the peripheral rim moves to the raised position. Further, it is contemplated that the actuator may be operably coupled with each of the extension members, such that the extension members are raised and lowered via a motorized assembly, a hydraulic assembly, or a pneumatic assembly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seat retention system comprising:
   a vehicle seating assembly including a seat including a seating surface and a seatback including a seatback surface;
   a continuous peripheral rim disposed on a first side, second side and front of the vehicle seat, below the seating surface of the vehicle seating assembly, the continuous peripheral rim generally defining a transitional trim piece of the seating surface;
   a first telescoping extension disposed at a forward corner defined between the first side and the front of the vehicle seat;
   a second telescoping extension disposed at a forward corner defined between the second side and the front of the vehicle seat; and
   a deployable net disposed between the seat and the peripheral rim, the deployable net configured to be concealed within a seat base disposed below the seating surface, wherein the transitional trim piece forms an upper portion of the seating surface, the upper portion being smooth and continuous with a remainder of the seating surface when the telescoping extensions are retracted into the seat base, and the upper portion being non-smooth and discontinuous relative to the remainder of the seating surface when the telescoping extensions are extended upward out of the seating surface.

2. The vehicle seat retention system of claim 1, further comprising:
   a pull cup disposed on a front portion of the continuous peripheral rim.

3. The vehicle seat retention system of claim 1, wherein the continuous peripheral rim is generally U-shaped.

4. The vehicle seat retention system of claim 1, wherein the first and second telescoping extensions are operable between a retracted position and an extended position, and wherein the net is completely concealed when the first and second telescoping extensions are in the retracted position.

5. The vehicle seat retention system of claim 4, wherein the continuous peripheral rim is spring-biased to the extended position.

6. The vehicle seat retention system of claim 5, wherein the first and second telescoping extensions include a locking feature that temporarily secures the first and second telescoping extensions in the extended position.

7. The vehicle seat retention system of claim 6, wherein the continuous peripheral rim is operably coupled with an actuator that moves the first and second telescoping extensions to the extended position.

8. A vehicle seat retention system comprising:
   a vehicle seat including a seating surface;
   a peripheral rim disposed on first and second sides and a front of the vehicle seat;
   an extension disposed at each of four corners defined between the peripheral rim and the vehicle seat, wherein each extension includes at least three telescoping extension members;
   a handle formed in the peripheral rim; and
   a deployable net disposed between the vehicle seat and the peripheral rim, wherein the peripheral rim forms an upper portion of a surface of the vehicle seat, the surface being smooth and continuous when the extensions are retracted into the vehicle seat, and the upper portion being non-smooth and discontinuous relative to a remainder of the surface of the vehicle seat when the extensions are extended upward out of the vehicle seat.

9. The vehicle seat retention system of claim 8, wherein the handle is integrally formed as part of the continuous peripheral rim.

10. The vehicle seat retention system of claim 8, wherein the continuous peripheral rim is substantially U-shaped.

11. The vehicle seat retention system of claim 8, wherein the continuous peripheral rim is spring-biased to an extended position.

12. The vehicle seat retention system of claim 11, wherein the extensions include a locking feature that temporarily secures the extensions in the extended position.

13. The vehicle seat retention system of claim 12, wherein the continuous peripheral rim is operably coupled with an actuator that moves the extensions to the extended position.

14. A vehicle seat retention system comprising:
   a peripheral rim disposed on first and second sides and a front of a vehicle seat above a seat base and defining a transitional trim piece having an outer perimeter that generally matches an outer perimeter of the seat base;
   telescoping extensions that moveably couple each of four corners of the peripheral rim to the seat base; and
   a deployable net disposed between the seat and the peripheral rim, wherein the transitional trim piece forms an upper portion of a surface of the seat base, the surface being smooth and continuous when the telescoping extensions are retracted into the seat base, and the upper portion being non-smooth and discontinuous relative to a remainder of the surface of the seat base when the telescoping extensions are extended upward out of the seat base.

15. The vehicle seat retention system of claim 14, wherein the continuous peripheral rim is spring-biased to an extended position.

16. The vehicle seat retention system of claim 14, further comprising:
 a pull cup disposed on a front portion of the continuous peripheral rim.

17. The vehicle seat retention system of claim 16, wherein the continuous peripheral rim is operably coupled with an actuator that moves the telescoping extensions to the extended position.

\* \* \* \* \*